June 12, 1962   M. D. TUPPER   3,038,765
THRUST BEARING ARRANGEMENT FOR DYNAMOELECTRIC MACHINES
Filed Aug. 31, 1960   4 Sheets-Sheet 1

Inventor:
Myron D. Tupper,
by H. F. Manbeck, Jr.
Attorney.

Inventor:
Myron D. Tupper,
by H. F. Manbeck, Jr.
Attorney.

June 12, 1962 M. D. TUPPER 3,038,765
THRUST BEARING ARRANGEMENT FOR DYNAMOELECTRIC MACHINES
Filed Aug. 31, 1960 4 Sheets-Sheet 3
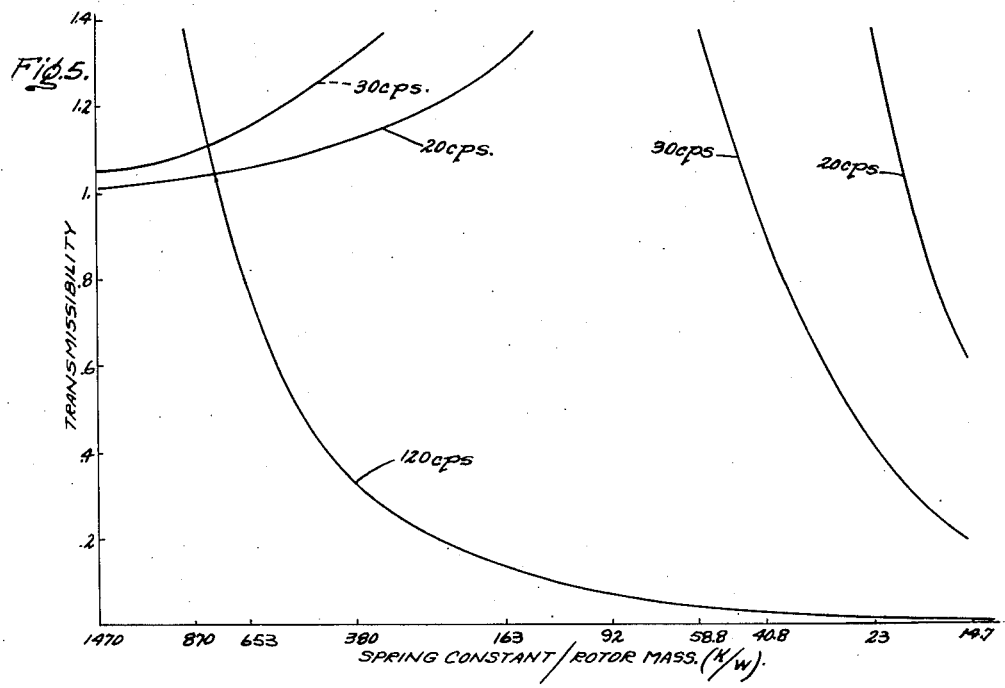
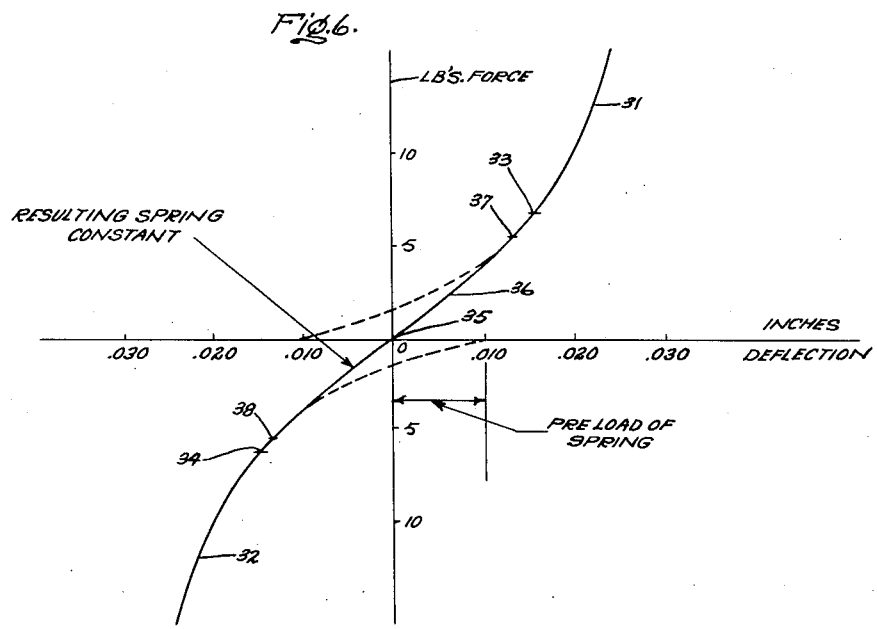
Inventor:
Myron D. Tupper,
by H. F. Manbeck, Jr.
Attorney.

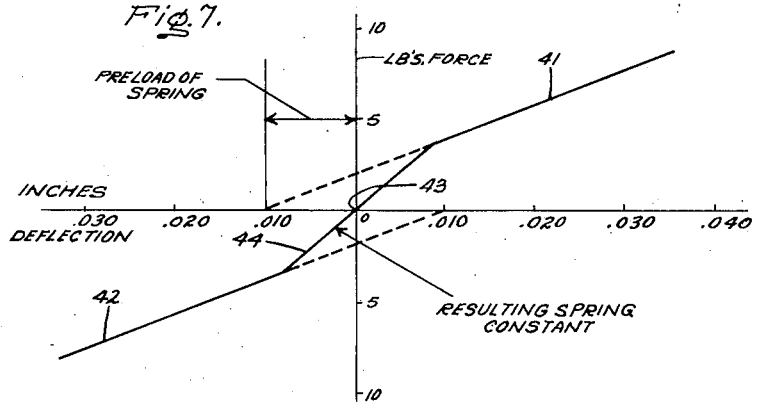
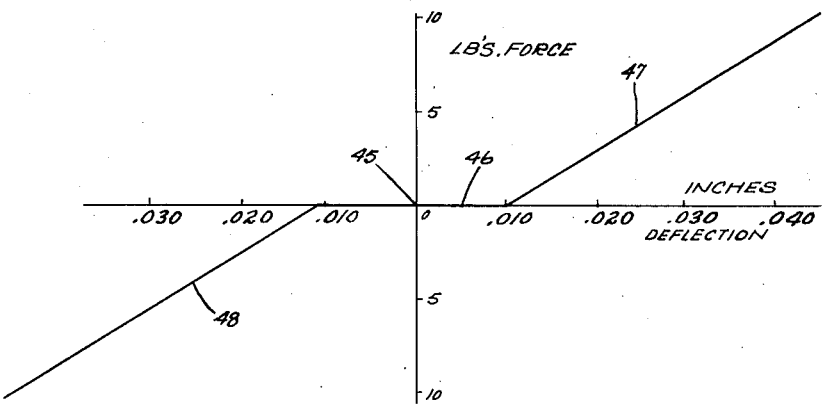
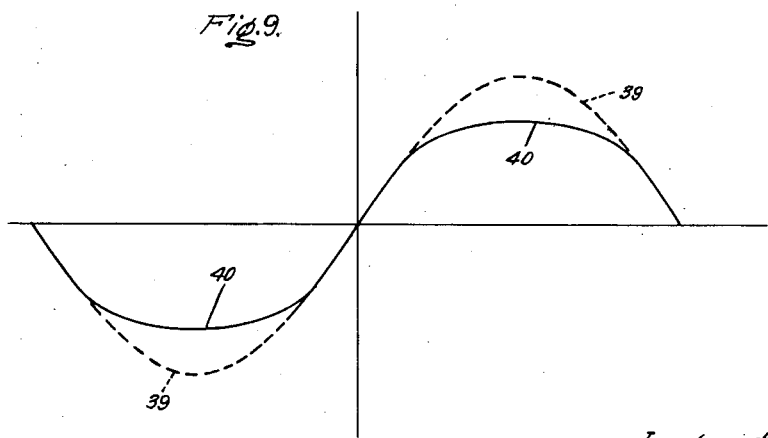

United States Patent Office 3,038,765
Patented June 12, 1962

3,038,765
THRUST BEARING ARRANGEMENT FOR DYNAMOELECTRIC MACHINES
Myron D. Tupper, Fort Wayne, Ind., assignor to General Electric Company, a corporation of New York
Filed Aug. 31, 1960, Ser. No. 53,193
9 Claims. (Cl. 308—163)

My invention relates to a thrust bearing arrangement for cushioning the axial thrust of a rotatable shaft and more particularly to such an arrangement for use in small dynamoelectric machines.

In the design of small dynamoelectric machines, it is very desirable, if not essential, that the operational noises be kept as low as possible. This is especially true for small motors intended for domestic and office use, as in fans, refrigerators and other appliances. One very troublesome source of noise is the "end bump" noise set up by the varying axial thrust of the rotor against its thrust bearings during operation. This end bump problem is particularly serious in shaded pole motors because of the strong 120 cycle forces originating in the rotor due to the skewing of the rotor conductors and unavoidable solenoid effects. These forces excite the end shields which carry the shaft bearing, causing vibration therein and producing an objectional level of noise.

The generally accepted approach to reduce the effect of these forces on the end shields and thereby reduce noise has been to isolate the rotor axially with springs. The springs tend to absorb the axial forces created in the rotor and thus limit their effect on the end shields. For example, one such arrangement which has been widely used is shown in the patent to A. F. Welch No. 2,078,783, dated April 27, 1937. There has, however, been a problem in taking up the axial end bump forces in this manner. Although the springs may be effective to prevent the transmission of the fundamental frequency of the end bump forces to the end shields, they have not been particularly effective in preventing the transmission of harmonics of the fundamental frequency.

In studying this problem, I have found one significant reason why objectionable forces and particularly harmonics are transmitted to the end shields is that the spring constant of the system isolating the rotor is not linear. In other words, the combined spring constant of the thrust springs on each side of the rotor is not a straight line plot in the region in which the springs are normally acting. The forces applied from the rotor vary more or less sinusoidally and since only a linear spring constant will give a sinusoidal deflection curve when a sinusoidal force is applied, the result of the thrust system nonlinearity is a nonsinusoidal curve including harmonics which are transmitted to the end shields. In other words, harmonics of the fundamental frequency are generated in nonlinear spring system and then transmitted through the thrust bearings to the end shields. The third and fifth harmonics, which are ordinarily the largest, are particularly detrimental in that they are more likely to excite the end shields than is a fundamental force of the same magnitude, the end shields being more likely to resonate at the higher frequencies. All in all, the transmissibility of the spring system, i.e., the ratio of its transmitted force to its applied force, is definitely increased by the nonlinearity of the system spring constant.

Accordingly, it is an object of my invention to provide a new and improved thrust bearing arrangement for use in dynamoelectric machines, which is especially designed to have a linear spring constant throughout its operating range.

It is another object of my invention to provide a new and improved thrust bearing arrangement for use in dynamoelectric machines, which will effectively prevent the transmission of objectionable end bump forces from the rotor to the end shield at both the fundamental and the harmonic frequencies.

It is a further object of my invention to provide an improved thrust bearing system which may be readily produced and assembled in a small dynamoelectric machine at relatively low cost and which will substantially limit the end bump noise created in the machine.

In carrying out my invention in one form thereof, I provide a thrust bearing system for the rotatable shaft of a dynamoelectric machine. The rotatable shaft carries the rotor of the machine and is provided with a pair of oppositely facing thrust surfaces located on the opposite sides of the rotor. A pair of thrust receiving members are mounted adjacent these thrust surfaces and are aligned generally axially therewith. A separate spring is positioned between each of the thrust surfaces and its associated thrust receiving member and these springs apply opposing biases to the thrust surfaces to hold the shaft resiliently in a normal axial position when it is at rest. By my invention, the springs have substantially nonlinear spring constants and they combine to produce an over-all linear spring constant for the thrust bearing system in its normal operating range. Thus, the displacement of the shaft and rotor caused by the sinusoidal skew and solenoid forces occurring in the rotor during operation itself varies substantially sinusoidally and there are few force harmonics transmitted to the machine end shields to cause vibration and noise.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

FIG. 5 is a graph showing the effect of the magnitude of the spring constant on the transmissibility of forces at different frequencies in a spring loaded thrust bearing system;

FIG. 6 is a graph of deflection versus force for my new and improved thrust bearing system;

FIG. 7 is a graph of deflection versus force for a conventional thrust bearing system of the preloaded type;

FIG. 8 is a graph of deflection versus force for a conventional thrust bearing system with free end play; and FIG. 9 is a plot showing the sinusoidal deflection curve which is obtained in my improved thrust bearing arrangement when a sinusoidal thrust force is applied thereto, as contrasted to the nonsinusoidal curve obtained for the same force in a conventional thrust bearing system.

Figure 1:
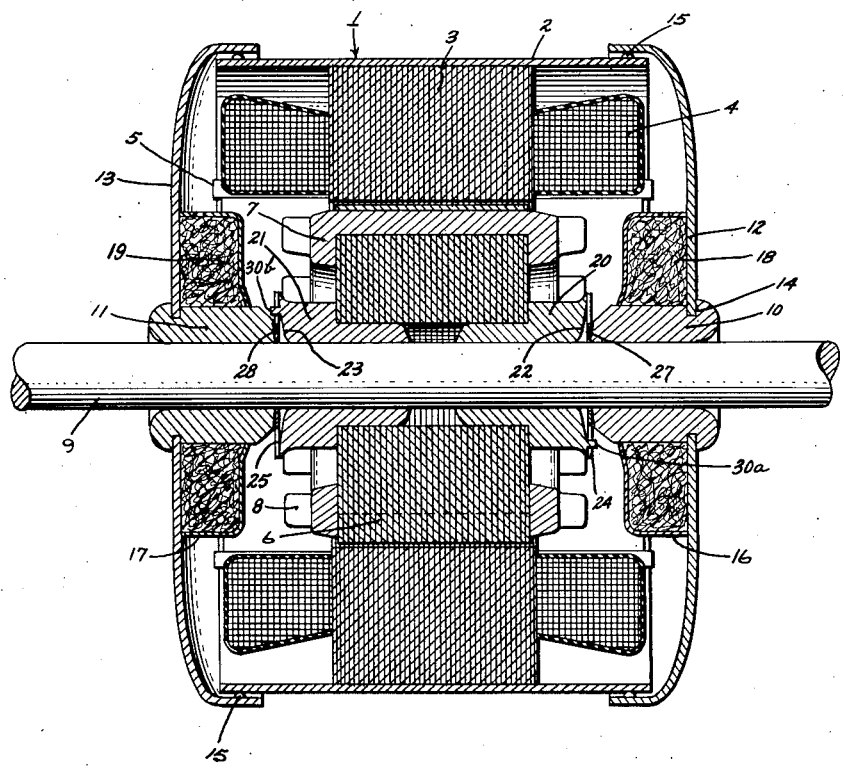
FIG. 1 is a longitudinal sectional view of an electrical motor embodying my new and improved thrust bearing arrangement in one form thereof.

Referring now to FIG. 1, I have shown therein a shaded pole motor 1 which is provided with a preferred embodiment of my new and improved thrust bearing system. The motor 1 includes an outer cylindrical shell member 2 within which is mounted a stator core member 3 formed of a plurality of laminations of magnetic material. The stator 3 includes a plurality of salient poles on which are mounted energizing windings or coils 4. These poles are further provided in the usual manner with tip sections which are surrounded by shading coils 5 for providing starting torque.

Mounted within the stator 3 and excited magnetically therefrom is a rotor member 6. The rotor 6 is formed of a stack of magnetic laminations and includes slots adjacent its outer periphery in which are formed the conductors of a squirrel cage winding. These conductors are joined by end rings 7 on which fan blades may be integrally formed as indicated at 8. The rotor 6 is carried by a rotatable shaft 9 which is journaled in bearings 10 and 11 disposed on opposite sides of the rotor. As shown, the bearings 10 and 11 are carried by the opposite end shields 12 and 13 of the motor. The bearings are shown as being staked to the end shields, as indicated particularly at 14, but it will be understood that they may be attached thereto in any suitable manner. The end shields themselves are welded to the stator shell 2 as indicated at 15 but it will be understood that they may be bolted thereto or secured in any other suitable manner.

Besides supporting the bearings 10 for mounting the shaft 9, the end shields also carry generally cupped shaped members 16 and 17 which are disposed around the bearings 10 and 11. These cup shaped members form lubricant reservoir spaces and within these spaces there are disposed absorbent felt pads 18 and 19 which are impregnated with oil or other suitable lubricant for lubricating the bearings 10 and 11. The bearings 10 and 11 are preferably formed of sintered material and it will be understood that during operation the lubricant seeps from the pads 18 and 19 through the bearings to their inner journaling surfaces and thereby lubricates those surfaces.

Within the motor 1, I have provided a new and improved thrust bearing system for cushioning and absorbing the axial forces occurring in the rotor during operation. The rotor conductors are preferably skewed and, as is well-known in the art, this necessarily results in sinusoidally varying axial forces being created in the rotor at a frequency of 120 cycles per minute. Also, there are what may be termed solenoid effects occurring in the rotor at basically the same frequency. My invention is intended to limit the transmission of these forces to the end shields 12 and 13 and also limit the generation and transmission of harmonics of these forces to the end shields, thereby to prevent vibration and noise during operation. In order that minimum exciting forces be transmitted to the end shields, two things are necessary. In the first place, the transmissibility of the thrust bearings must be low for the fundamental driving frequency. In other words, the ratio of the transmitted forces to the applied forces should be kept as low as possible consonant with feasibility and cost. Secondly, the thrust bearing system should be such that harmonics of the fundamental force pattern are not generated and transmitted to the end shields since these harmonics are for a given magnitude more likely to excite the end shields than the fundamental. Given a sinusoidally varying axial force, only a linear spring constant for the thrust system will give a sinusoidal deflection curve, and only such a deflection curve will prevent the transmission of harmonics to the end shield. Thus, it is extremely desirable that the thrust bearing system have a linear spring constant.

Figure 3:
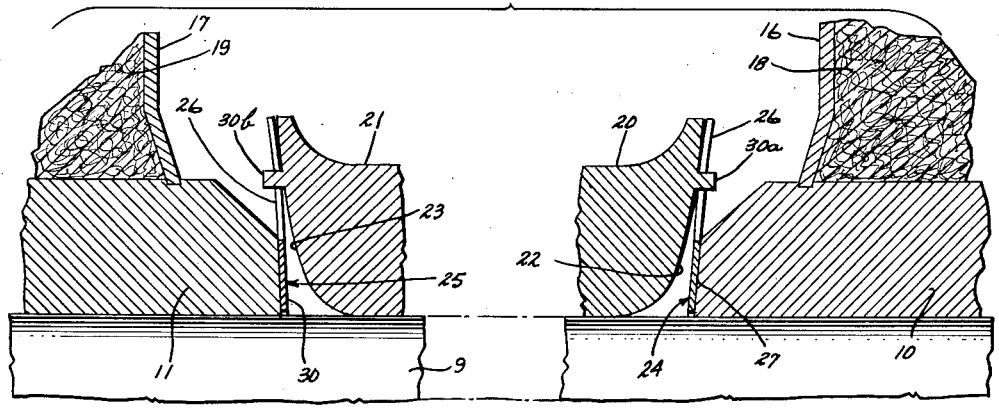
FIG. 3 is an enlarged fragmentary view showing the thrust bearings of the arrangement in their normal or "at rest" condition.
Figure 4:
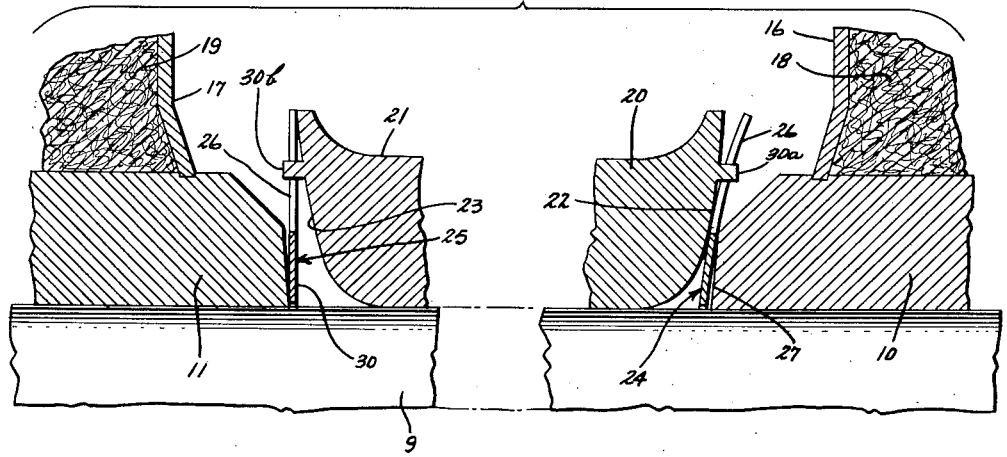
FIG. 4 is a view similar to FIG. 3 showing the same thrust bearings under a condition of load.

Referring now to FIGS. 1, 3 and 4, I have shown therein my improved thrust bearing system which provides for low transmissibility of the fundamental frequency of the axial rotor forces to the end shields 12 and 13 and also is effective to limit, if not wholly prevent, the generation and transmission of any axial force harmonics to the end shields. This system includes a pair of annular thrust transmitting collars 20 and 21 which are disposed around the shaft 9 on opposite sides of the rotor 6. These thrust collars are fixed to the rotor at their inboard ends and at their outboard ends are curved or tapered from their outer edges toward the shaft. In particular, their respective outer surfaces 22 and 23 are arcuate in shape curving toward the rotor from their outer ends toward their inner ends. The radius of the arc is of relatively large magnitude as may be readily seen by examination of FIGS. 3 and 4.

Figure 2:
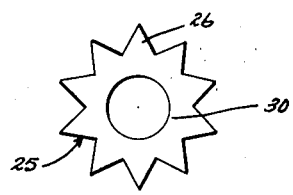
FIG. 2 is a front view of the thrust cushioning spring used in the thrust bearing arrangement.

The thrust collars are axially aligned with the bearings 10 and 11 and the respective inboard ends of the bearings 10 and 11 serve as the thrust receiving surfaces for the axial forces passed to the thrust collars from the rotor 6. To absorb and cushion the axial forces, a pair of annular star shaped springs 24 and 25 are positioned between the thrust collars and the bearings 10 and 11. The shape of these springs may be best seen by reference to FIG. 2. As shown the springs 24 and 25 engage the bearings 10 and 11 respectively in a region relatively adjacent the shaft and they are engaged by the thrust surfaces 22 and 23 in a region relatively remote from the shaft. In other words, the engagement between each thrust collar and its spring is radially outward from the engagement between the associated thrust receiving surface and the spring. With this arrangement, the arcuate thrust surfaces 22 and 23 engage the points or lobes 26 of the springs while the thrust receiving surfaces 27 and 28 of the bearings engage the annular center portion 30 of the springs. It will be noted that the thrust receiving surfaces 27 and 28 are themselves tapered slightly in a direction from the shaft outward. In other words, they slope outboard with increasing radial distance from the shaft.

Bosses 30a and 30b are formed in the thrust surfaces 22 and 23 and extend between adjacent lobes of the springs 24 and 25 to turn the springs with the rotor and shaft. Thus, the sliding friction contact of the thrust system is between the rotating springs and the stationary thrust receiving surfaces 27 and 28 of the bearings 10 and 11.

As is best shown in FIG. 3, the thrust collars 20 and 21 are of such size and arrangement relative to the bearings 10 and 11 that the springs 24 and 25 produce an initial biasing force on the rotor holding it in a normal position. In other words, the thrust collars project axially at their outer ends above and slightly past the thrust receiving surfaces 27 and 28. Thus, they flex the springs 24 and 25 slightly and the springs provide a biasing force tending to maintain the rotor and its shaft in a normal axial position. The system having this characteristic may be termed as "pre-loaded" as contrasted to a free end play system in which there is no initial centering force. The slight stressing of the springs to provide the preloading may be readily seen in FIG. 3 wherein it will be noted that the points or lobes 30 of the star shaped springs are slightly bowed from their unloaded or straight positions.

As the rotor turns during operation, certain axial forces are created therein due to the skewing of the conductors and the solenoid forces occurring in the rotor, these forces having a fundamental frequency of 120 cycles per second. As a result of these forces, the rotor tends to move against one or other of the thrust springs. If we assume that in illustrated machine 1 these axial forces vary sinusoidally toward the right-hand side of the motor, then a varying force is applied to the spring 24 and at the same time an equal force is, in effect, removed from the spring 25. Thus, as illustrated in FIG. 4, the spring 24 bows more to the outboard or right side at the same time as the spring 25 straightens out. Depending upon the magnitude of the forces supplied, the spring 24 may bow more or less than shown and, in fact, if enough force is applied the spring 25 will become completely unstressed with a slight clearance between it and the thrust surface 23.

It will be noted that as the rotor oscillates further to the right as viewed in FIGS. 1 and 4, the region of contact between the thrust surface 22 and the spring 24 moves inwardly. In other words, the points of contact between the lobes 26 of the spring and the thrust surface; i.e., the regions of force transmission, move inwardly as the rotor shifts to the right. Conversely, the region of contact between the spring 25 and the thrust surface 23 shifts outwardly. On the other hand, if the rotor should in effect oscillate axially in the other direction then the regions of contact would shift reversely. The contact between spring 25 and surface 23 would move inwardly while that between spring 24 and surface 22 would move outwardly. It will be noted that the taper on the thrust receiving surfaces 27 and 28 allows for the bowing of the springs while maintaining a relatively large area of contact between the thrust receiving surfaces and the springs.

With this arrangement, I provide a thrust bearing system wherein the over-all spring constant of the system is linear throughout its normal range of operation. In other words, whether the rotor and shaft move to the right or the left, and despite the magnitude of this movement within normal limits, the movement per unit of force applied will be the same. Whether the shaft moves far enough that the one thrust surface 22—23 leaves its spring entirely while the other surface causes a considerable bowing of its spring, or whether only a slight bowing of the load absorbing spring is effected with contact still remaining between the other spring and its thrust surface, the same movement per unit of force will be obtained. As a result of this, assuming a sinusoidally varying fundamental force is applied, the deflection of the springs themselves will be sinusoidal. With this sinusoidal deflection there will be little, if any, generation of harmonics of the fundamental driving frequency, and thereby few harmonics will be transmitted to the bearings 10 and 11 and thus to the end shields which mount the bearings, and consequently there will be few, if any, force harmonics tending to excite the end shields and cause noise. The springs 24 and 25 also have sufficiently low spring constants that the fundamental force transmitted to the end shields is only a fraction of the applied force itself. In other words, the springs absorb most of the fundamental force by flexure so that the transmissibility of the force to the end shields is low.

The over-all linear spring constant of the thrust bearing system in the normal operating range is obtained by making the springs 24 and 25 so that individually they have a nonlinear spring constant. In other words, the individual constants or characteristics of the two springs are nonlinear in shape but their nonlinear characteristics combine to give an over-all linear characteristic for the entire system. This nonlinear characteristic is obtained for the individual springs primarily by the star shape of the springs and through the arcuate shape of the thrust faces 22 and 23 which contact them. The manner in which the two nonlinear springs 24 and 25 combine to produce an over-all linear spring constant is shown in FIG. 6.

In FIG. 6, the curve 31 illustrates the force versus deflection characteristic of the spring 24 and the curve 32 illustrates the force versus deflection characteristic of the spring 25. It will be noted that these curves are nonlinear but have generally the same slope for the normal operating range of the machine, the limits of this range being indicated by the mark 33 on the curve 31 and the mark 34 on the curve 32. On either side of the normal or zero point 35, the curves have identical slopes and when the over-all characteristic of the system is plotted in this range by subtracting the characteristic of the one spring from that of the other depending on the direction of movement of the rotor, a straight line 36 is obtained which is the spring constant of the system for the range in which both springs are in engagement with the rotor thrust surfaces 22 and 23. In one preferred embodiment of my invention having a rotor and shaft weight of 0.715 lb., this straight line characteristic comprises a spring constant of approximately 210 in terms of lbs. of force per inch of deflection. At the ends 37—38 of the range, wherein both springs are operating on the rotor, the curves 31—32 are of such slope that they in effect continue the line 36 for the length of the normal operating range. In other words, between the zero or rest point 35 and either of the limits 33 and 34 of the normal operating range the force versus deflection curve for the entire thrust bearing system is linear.

This linearity of the over-all system spring constant has a substantial advantage in that it results in few if any force harmonics being transmitted to the bearings 10 and 11 and thus to the end shields 12 and 13. With this linear spring constant for the system and a sinusoidally varying axial force applied from the rotor, the result is a sinusoidal deflection of the spring or movement of the rotor. This sinusoidal deflection is, for example, illustrated by the curve 39 of FIG. 9. It will be noted that FIG. 9 also includes another curve 40 and this curve is illustrative of the rotor deflection when a nonlinear, spring biased thrust bearing system is used, i.e., when a conventional system is used. Curve 40 is quite flat as compared to the sinewave 39 and it therefore results in harmonics of the applied force being generated in the springs and transmitted to the end shields. As previously pointed out, these harmonics even move so that the fundamental force tends to excite the end shields and cause them to vibrate. Thus, my improved system wherein a sinusoidal displacement of the rotor is obtained as a result of the over-all linear spring constant is much less likely to cause end shield vibration and noise than a conventional thrust bearing system.

Besides being effective to prevent the transmission of harmonics, my improved system is also effective to absorb the greater part of the fundamental wave of the axial force so that it too is not transmitted to the bearings and end shields in large magnitude. FIG. 5 illustrates a graph of transmissibility versus spring constant over rotor mass (K/W) for the fundamental force of 120 cycles per second and for the "once around" frequencies of 30 c.p.s. and 20 c.p.s. Transmissibility may be defined as the ratio of the transmitted force to the applied force, and the spring constant over rotor mass is here shown in terms of lbs. per inch of deflection per lb. of mass. It will be noted that in the above mentioned preferred embodiment the system spring constant is 210 and motor mass is 0.715. Thus, the K/W factor is 294 and the transmissibility for the fundamental force of 120 c.p.s. is in the neighborhood of 0.2 which means that only two tenths of the fundamental force applied to the thrust springs 24 and 25 is transmitted to the bearings. Thus, my improved system not only is effective to prevent the transmission of harmonics but also is effective to prevent the transmission of the fundamental force.

The "once around" force frequencies are the frequencies which correspond to the revolutions per second of the rotor and shaft. If there are any irregularities in the thrust receiving surfaces 27 and 28, or if either surfaces 27—28 and its respective thrust spring 24—25 are cocked relative to the shaft, the irregularities or cocking will cause an oscillating axial movement of the shaft once per revolution thereof. In other words, each time the shaft 9 turns around, it will move slightly forward and back axially. This movement, of course, applies a varying force to the thrust springs having a frequency equal to the revolutions per second of the shaft. Thus, for a four pole motor which rotates at 1800 r.p.m., the "once around" force frequency is 30 c.p.s., while for a six pole motor which rotates at 1200 r.p.m., the "once around" force frequency is 20 c.p.s.

To have a satisfactory thrust bearing system, it is necessary that the transmissibility for the "once around" frequency of the motor also be considered. The transmissibility of the "once around" frequency may be somewhat greater than unity since the lower frequencies do not tend to excite the end shields as much as higher frequencies, but it may not be too great since the low frequencies can cause both vibration and noise if they are strong enough in amplitude. FIG. 5 shows the transmissibility for the "once around" frequencies of 30 c.p.s. and 20 c.p.s. plotted against the spring constant over rotor mass (K/W) for the thrust bearing system. It will be noted that these curves have a very steep slope toward their center rising theoretically to infinity at their peaks. The peaks occur for the 30 cycle curve at a K/W of 92 and for the 20 cycle curve at a K/W of 40.8, K/W being defined as pounds of force per inch of deflection over lbs. of rotor mass. To prevent serious end shield vibration, it is therefore necessary that the spring constant be chosen so as to avoid the peaks in the 30 cycle and 20 cycle curves (assuming the motor in question is either a four pole motor or a six pole motor). I have found that if the K/W factor is made at least 150 in terms of pounds of force per inch of deflection over lbs. of rotor mass, no serious vibration or noise will occur in these motors because of the "once around" frequencies. However, if the K/W factor is decreased appreciably below this, then the transmissibility for the "once around" frequencies decreases sharply so that no trouble is likely to occur.

It will be noted that the transmissibility of the "once around" forces diminishes again for very low K/W factors, that is, at very low spring constant, for example, at a K/W of 15. However, there are practical difficulties militating against operation at the low spring constant. In particular, there would be too great a deflection per pound of force applied requiring much larger axial clearances for the rotor. Also, there would be an unacceptable axial displacement of the rotor from its normal position due to its own weight if the motor were mounted vertically.

Although the effect of the "once around" frequencies determines the lower limit of the spring constant, the upper limit is set by the 120 cycle curve. The 120 cycle curve begins to slope slightly upward beginning at about a K/W factor of 400 and I have found that it is desirable to keep the K/W factor at 600 or below. If the spring constant is large enough that the K/W factor is above 600, then the transmissibility at the 120 c.p.s. frequency becomes large enough that vibration of the end shields and noise are likely to occur. It will be seen that the 294 K/W factor of the illustrated embodiment resulting from its 210 spring constant gives a relatively low transmissibility for the 120 cycle forces while at the same time providing an acceptable transmissibility for the "once around" force frequencies.

Incidentally, it will be understood that only portions of the total curves for the various frequencies are shown in FIG. 5 and that there is a theoretical infinite peak in the 120 cycle curve at a K/W factor of 1470. Above 1470, the 120 cycle curve decreases again but it never falls below unity, as is also true for the 30 cycle and the 20 cycle curves, so that my improved system should always be operated in the illustrated portions of the curves.

It will be remembered that in FIG. 6, I have illustrated how the non-linear springs 24 and 25 combine to produce a thrust bearing system which has a linear spring constant throughout its normal operating range. This over-all linear spring constant, of course, comprises an important feature of my invention limiting the transmission of harmonics to the thrust receiving surfaces and the end shields. For the purposes of comparison, I have included herein FIGS. 7 and 8 showing how conventional thrust bearing systems using individually linear springs as contrasted to my nonlinear springs do not produce an overall linear spring constant and thereby cannot give the same results as my improved system.

Referring now to FIG. 7, I have shown therein the system characteristic for a conventional preloaded thrust bearing system. This system includes a pair of springs positioned on opposite sides of the rotor and applying forces to center it in its normal position. The conventional system to this extent is similar to my new and improved system, which, it will be remembered, is of the preloaded type; but the conventional system used linear springs as contrasted to my special nonlinear spring. In FIG. 7, the line 41 shows the deflection of one of the centering springs in response to the axial force of the rotor and the line 42 shows the deflection of the other spring in response to the same force. These lines are both straight since both springs have a linear spring constant. However, the over-all spring constant of the system is not linear. It will be seen that as the motor starts to move in either direction from its normal position 43, the over-all characteristic of force versus deflection for the system will follow the line 44. In particular, if the rotor pushes against one spring with enough force to move against it, the other spring will be to some extent aiding this force so the resultant force versus deflection curve will be the difference between lines 41 and 42, which is line 44. Thus, the force versus deflection curve will follow the line 44 until the rotor has moved far enough that only one spring, i.e., the spring opposing movement, is acting on the rotor. Thereafter, of course, the system curve will follow line 41 or 42 depending upon which spring is opposing the rotor movement. Thus, the over-all spring constant for the system is nonlinear, the spring constant being shown by the line 44 for the initial deflection of the rotor in either direction from its normal position 43, and the spring constant then being shown by the lines 41 or 42 when the rotor moves far enough that only one spring is affecting it.

Referring now to FIG. 8, I have shown therein the characteristic of another thrust bearing system which has heretofore been widely used, namely, the free end play system. The free end play system also has springs disposed on opposite sides of the rotor but they apply no bias in the normal position 45 of the rotor. Rather, they begin to apply a restoring force only after the rotor has moved slightly from its normal position. Since there is no initial biasing or preloading of the rotor and the shaft, there is no force applied to the rotor as it begins to move initially from its normal position. In FIG. 8, this is illustrated by the horizontal portion 46 of the graph. When the rotor moves far enough, it then begins to engage the spring on one side or the other and then the rotor movement is determined by the linear characteristic of that spring as indicated at 47 and 48. Thus, it will be quite obvious that the over-all characteristic for the free-end play system is quite nonlinear just as in the conventional preloaded system.

From FIGS. 7 and 8, it will be seen that neither the conventional preloaded system nor the free end play system can provide the desirable results of my invention. In both systems, the over-all system spring constant is decidedly nonlinear and thereby the deflection of the rotor under a sinusoidally varying force will itself not be sinusoidal. With the rotor moving axially in a nonsinusoidal pattern, force harmonics will necessarily be transmitted to the thrust receiving surfaces and the end shields and these harmonics are, of course, more likely to cause vibration and noise than is the fundamental force frequency. Thus, it will be seen that the conventional system is clearly disadvantageous as compared with my new and improved system having the individually nonlinear springs combining to produce an over-all linear spring constant.

While in accordance with the patent statutes I have described what at present is considered to be the preferred embodiment of my invention, it will be obvious to those skilled in the art that various changes and modifications may be made therein without departing from the true spirit and scope of the invention and it is therefore aimed in the appended claims to cover all such equivalent variations as fall within the invention.

What I claim as new and desire to secure by Letters Patent of the United States is:

1. A thrust bearing system for a rotatable shaft having a pair of oppositely facing thrust surfaces, comprising a pair of thrust receiving members positioned adjacent said thrust surfaces, and a pair of springs disposed respectively between said thrust surfaces and thrust receiving members and applying initial opposing biases to said thrust surfaces to hold said shaft in a normal pre-loaded axial position, said springs having substantially identical nonlinear spring constants and combining to produce an over-all generally linear spring constant for said thrust bearing system in its normal operating range.

2. A thrust bearing system for a rotatable shaft having a pair of oppositely facing thrust surfaces, comprising a pair of thrust receiving members positioned adjacent said surfaces, and a pair of springs disposed respectively between said thrust surfaces and said thrust receiving members and applying opposing biases to said thrust surfaces to hold said shaft in a normal axial position, said thrust surfaces being tapered from their outer edges toward said shaft in a direction away from said springs, with said springs engaging said tapered surfaces and having nonlinear spring constants combining to produce an over-all linear spring constant for said thrust bearing system in its normal operating range.

3. A thrust bearing system for a rotatable shaft having a pair of oppositely facing thrust surfaces, comprising a pair of thrust receiving members positioned adjacent said surfaces, and a pair of springs disposed respectively between said thrust surfaces and said thrust receiving members and applying initial opposing biases to said thrust surfaces to hold said shaft in a normal axial position, said springs being generally star shaped in configuration with the star points engaging said thrust surfaces and with center portions of said spring engaging said thrust receiving members, said springs producing an over-all generally linear spring constant for said thrust bearing system in its normal operating range.

4. A thrust bearing system for a rotatable shaft having a pair of oppositely facing thrust surfaces, comprising a pair of thrust receiving members positioned adjacent said surfaces, and a pair of springs disposed respectively between said thrust surfaces and said thrust receiving members and applying opposing biases to said thrust surfaces to hold said shaft in a normal axial position, said thrust surfaces being curved from their outer edges toward said shaft in a direction away from said springs, said springs being generally star shaped in configuration with the star points engaging the curved thrust surfaces and with the center portions of said springs engaging said thrust receiving members, said springs having individual nonlinear spring constants combining to produce an over-all linear spring constant for said thrust bearing system in its normal operating range.

5. In a dynamoelectric machine, a rotor, a rotatable shaft mounting said rotor, and a thrust bearing system for said shaft comprising a pair of oppositely facing, axially fixed thrust surfaces disposed respectively on opposite sides of said rotor and rotating with said shaft, a pair of stationary thrust receiving members positioned adjacent said surfaces, and a pair of springs disposed respectively between said thrust surfaces and said thrust receiving members and applying initial opposing biases to said thrust surfaces to hold said rotor and shaft in a normal pre-loaded axial position, said springs and said thrust surfaces engaging in a region spaced from said shaft and being shaped to cause the respective regions of engagement to move inwardly toward said shaft on one side of said rotor and outwardly away from said shaft on the other side of said rotor upon axial movement of said shaft from its normal position in the direction toward said one side of said rotor, said springs having substantially identical nonlinear spring constants and combining to produce an over-all generally linear spring constant for said thrust bearing system in its normal operating range.

6. In a dynamoelectric machine, a rotor, a rotatable shaft mounting said rotor, and a thrust bearing system for said shaft comprising thrust collar means mounted on said shaft and forming a pair of oppositely facing thrust surfaces, a pair of thrust receiving members positioned adjacent said thrust collar means and having thrust surfaces aligned therewith, a pair of springs disposed respectively between the associated thrust surfaces of thrust collar means and said thrust receiving members and applying opposing biases to said thrust collar means to resiliently hold said shaft in a normal axial position, at least one of said thrust surfaces associated with each of said springs being tapered in an axial direction from its outer edge toward said shaft, and each of said springs engaging the tapered thrust surface associated therewith in a region radially spaced from the region in which it engages the other thrust surface, and each of said springs having a nonlinear spring constant which combine to produce an over-all linear spring constant for said thrust bearing system in its normal operating range.

7. In a dynamoelectric machine, a rotor, a rotatable shaft mounted on said rotor and a thrust bearing system for said shaft comprising a pair of thrust collars mounted respectively on said shaft on either side of said rotor and forming oppositely facing thrust surfaces, a pair of thrust receiving members positioned respectively adjacent said thrust collars and having thrust surfaces thereon, a pair of springs disposed respectively between the associated thrust surfaces of said thrust collars and said thrust receiving means and applying opposing biases to said thrust collars to resiliently hold said shaft in a normal axial position, said thrust surfaces of said thrust collars being curved from their outer ends toward said shaft in a direction away from said springs, and said springs being generally star shaped in configuration with the star points engaging the curved thrust surfaces of said thrust collars and with the center portions of said springs engaging said thrust surfaces of said thrust receiving members, said springs having nonlinear spring constants combining to produce an over-all linear spring constant for said thrust bearing system in its normal operating range.

8. In a thrust bearing system for a rotatable shaft having at least one thrust transmitting surface; a member formed with a thrust receiving surface positioned adjacent said thrust transmitting surface; said thrust surfaces being axially movable relative to each other, with at least one of said surfaces having a curved configuration; and a spring disposed between said thrust surfaces and arranged to engage said surfaces at generally radially spaced apart regions, with one of said regions including said curved thrust surface; the respective regions of engagement, between said spring and said surfaces, shifting radially toward one another as the axial distance between said surfaces is decreased.

9. In a thrust bearing system having at least one thrust transmitting surface for a rotatable shaft; a member formed with a thrust receiving surface positioned adjacent said thrust transmitting surface; a spring disposed between said thrust surfaces, with said thrust surfaces being axially movable relative to each other in response to axial movement of the shaft; at least one of said surfaces being tapered away from its outer edge toward said shaft in a direction away from said spring; said spring having a generally star configuration, with the star points arranged to engage said tapered thrust surface and with the center portions of said spring arranged to engage the other thrust surface.

References Cited in the file of this patent

UNITED STATES PATENTS

| | | |
|---|---|---|
| 2,078,783 | Welch | Apr. 27, 1937 |
| 2,307,772 | Duffy | June 12, 1943 |